(12) United States Patent
Zatloukal et al.

(10) Patent No.: US 8,156,139 B2
(45) Date of Patent: Apr. 10, 2012

(54) MEDIA PLAYING ON A PORTABLE MEDIA PLAYER INCLUDING SHOP AND PLAY REMOTE MEDIA

(75) Inventors: Peter Zatloukal, Seattle, WA (US); G. Eric Engstrom, Kirkland, WA (US); Bob Heddle, Kirkland, WA (US)

(73) Assignee: RealNetworks, Inc, Seattle, WA (US)

( * ) Notice: Subject to any disclaimer, the term of this patent is extended or adjusted under 35 U.S.C. 154(b) by 749 days.

(21) Appl. No.: 11/971,043

(22) Filed: Jan. 8, 2008

(65) Prior Publication Data

US 2008/0189255 A1    Aug. 7, 2008

Related U.S. Application Data

(60) Provisional application No. 60/883,987, filed on Jan. 8, 2007.

(51) Int. Cl.
*G06F 17/30* (2006.01)
*G06F 7/00* (2006.01)

(52) U.S. Cl. .................................. 707/769; 707/758
(58) Field of Classification Search ............... 707/104.1, 707/758, 769
See application file for complete search history.

(56) References Cited

U.S. PATENT DOCUMENTS

| 2006/0112144 A1* | 5/2006 | Ireton ........................ 707/104.1 |
| 2006/0161621 A1* | 7/2006 | Rosenberg .................... 709/204 |
| 2006/0167956 A1* | 7/2006 | Chasen et al. ................ 707/203 |
| 2008/0155079 A1* | 6/2008 | Spiegelman .................. 709/223 |

* cited by examiner

*Primary Examiner* — Kuen Lu
(74) *Attorney, Agent, or Firm* — Kory D. Christensen; Stoel Rives LLP

(57) ABSTRACT

A software and/or hardware facility enables shop and play remote media using a portable media player. Shopping may include, but is not limited to, allowing a user to identify media and acquire (via download or stream) the media to a portable media player for free or for compensation. The facility, in some embodiments, allows a user to shop for media on a network site or service using a portable media player via a wired or wireless connection. The facility, in some embodiments, automatically presents a user with media available from a network site or service that is related to the context of the user's use of the portable media player, such as when a user navigates or otherwise uses the portable media player. Other embodiments are described and claimed.

20 Claims, 6 Drawing Sheets

MEDIA PLAYING ON A PORTABLE MEDIA PLAYER INCLUDING SHOP AND PLAY REMOTE MEDIA

CROSS-REFERENCE TO RELATED APPLICATION(S)

This application claims priority to, and incorporates by reference in its entirety, U.S. Provisional Application No. 60/883,987, entitled "Wireless Media Shopping Using a Portable Media Player", filed on Jan. 8, 2007.

BACKGROUND

Portable media players are increasing in popularity. A portable media player is a transportable device that plays one or more media file types, including text, audio, video, graphics, animation, images, interactive, and other media file types.

A user can add media to a portable media player using a variety of methods. For example, a user can copy a compact disc (CD) of music onto a portable media player. In such a case, the user may utilize a software program to convert the music on the CD into the proper file type (e.g., MP3 format) for storage on the portable media player. As another example, a user can download media to a portable media player from a site accessible via a network such as the Internet. Content sites may offer the download for free, or may charge a fixed or subscription fee for the download. Typically, the user must usually first download media from the network site to a user's computer, and then the user may transfer the media from the computer to the portable media player.

DETAILED DESCRIPTION OF ILLUSTRATIVE EMBODIMENTS

A software and/or hardware facility that enables shop and play remote media via a portable media player is described. Shopping includes, but is not limited to, allowing a user to identify media and acquire (via download or stream) the media to a portable media player for free or for compensation. The facility, in various embodiments, allows a user to integrally shop for media on a network site or service using a portable media player via a wired or wireless connection, while using the portable media player to select and play local media. The facility, in various embodiments, automatically presents a user with media available from a network site or service that is related to a context of the user's use of a portable media player, such as when the user navigates or otherwise uses the portable media player to locate a media of an album, an artist or a genre to play. A user may also browse for available media from a main page of a network site or service. A user may download, stream, or otherwise access media from a network site or service. By allowing a user to integrally shop for media directly from a portable media player using a variety of methods, while using the portable media player to play media, the facility enables a user to more easily acquire media for the portable media player, and enhances the user's experience.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
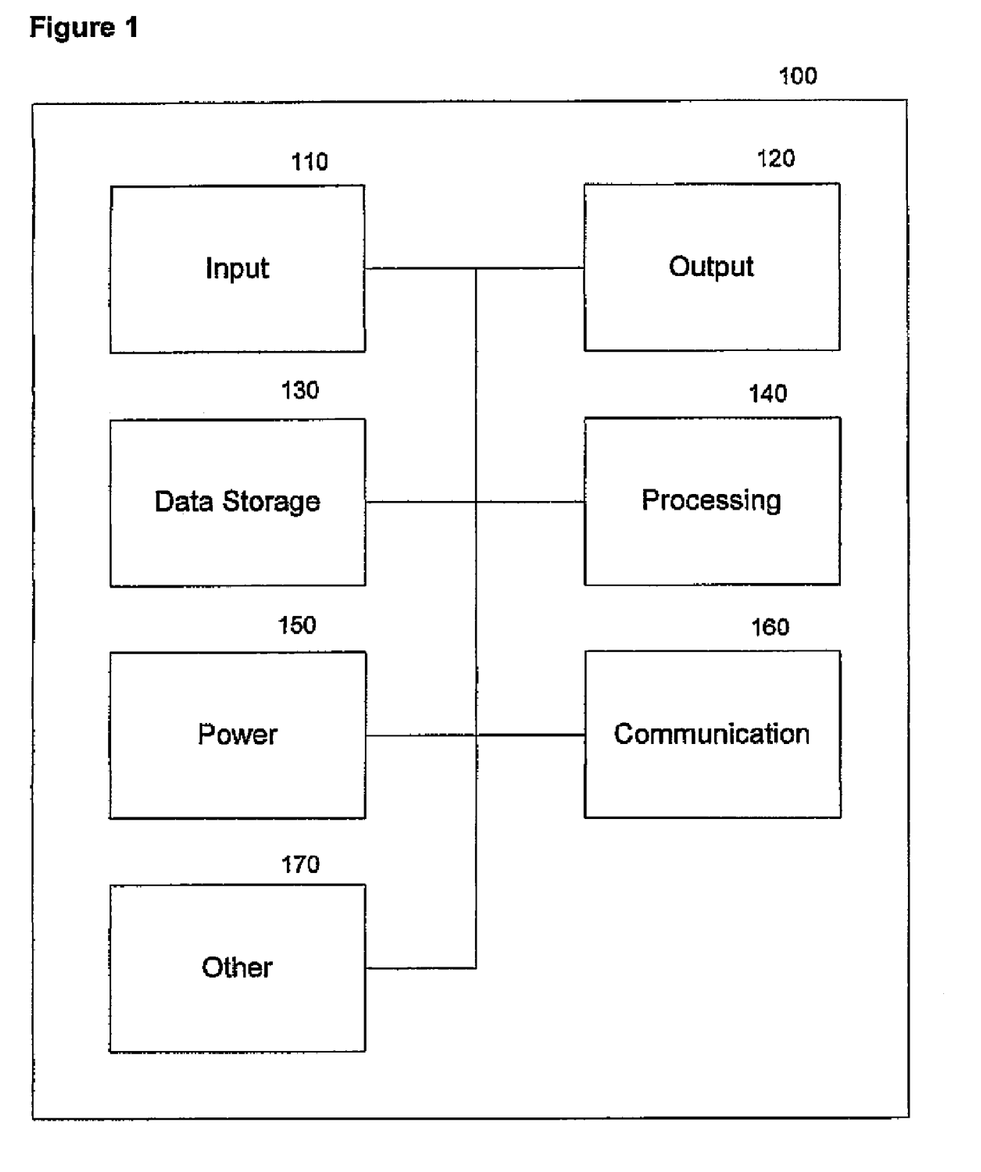
FIG. 1 is a block diagram of representative components in a portable media player suitable for shop and play remote media, in accordance with embodiments of the invention.

FIG. 1 is a block diagram illustrating representative components of a portable media player 100 suitable for practicing various embodiments of the invention. Portable media player 100, for the illustrated embodiments, includes an input component 110 and an output component 120, coupled to each other as shown. Input component 110 receives user input from one or more input controls, such as buttons, scroll wheels, touchpads, and so on. Output component 120 provides output to a user, and may include an audio playback module, a display module, and so on. Portable media player 100 also includes a data storage component 130. Data storage component 130 may be a magnetic media drive, optical media drive, other non-volatile memory, flash memory, and so on, capable of storing operational software and audio media, video media, image media, and other media types for playback via output component 120. The portable media player may also include a processing component 140 for implementing various software processes to implement various aspects of embodiments of the invention, as well as conventional software processes, such as searches, filtering, and other data manipulation on the media player. In various embodiments, some or all aspects of the embodiments of the invention may be implemented in hardware instead. For the illustrated embodiments, the portable media player also includes a power component 150 that supplies power to the player and the components of the player, and a communication component 160 that communicates with other devices and networks, such as via a wireless network. Examples of communication include wired communication, such as over a USB or firewire connection, wireless communication, such as via 802.11 based networks, and so on. Player 100 may also include other components 170, such as components for establishing mobile phone connections, not specifically described herein.

Figure 2:
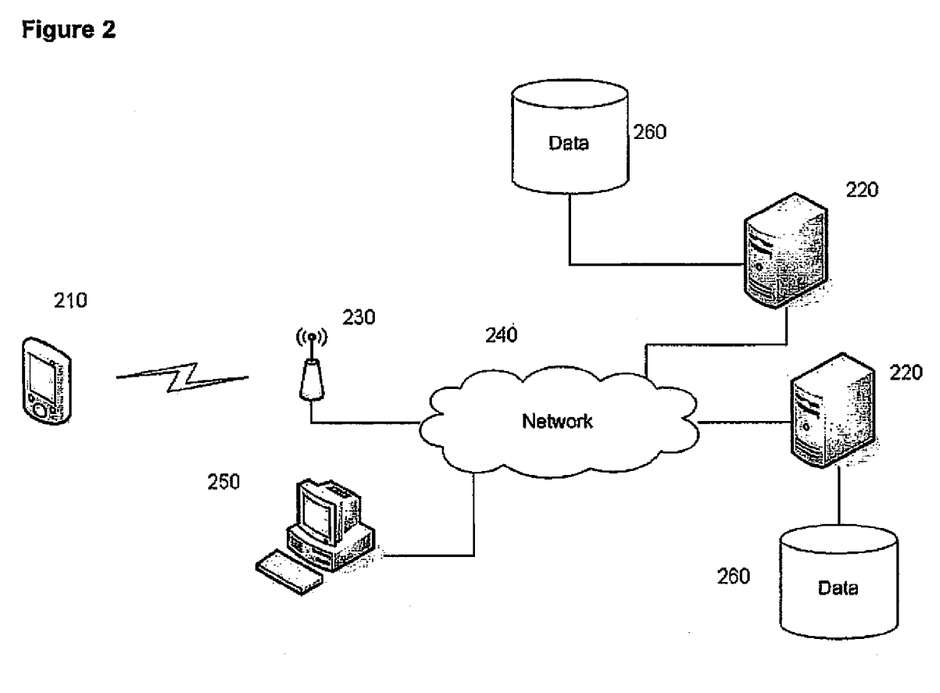
FIG. 2 depicts a network environment in which a facility operates to enable shop and play remote media by a user using a portable media player, in accordance with embodiments of the invention.

FIG. 2 depicts a representative environment in which the facility operates, in accordance with various embodiments. A portable media player 210 stores media. The portable media player 210 may also access media from a media site or service 220 via a wireless access point 230 and a network 240. Alternatively or additionally, a computer 250 may access media from one or more media services 220 via the network 240. The facility may transmit the media between the computer 250 and the portable media device 210, such as when the media stored on the computer is synched with the media that are on the portable media player. Information about a user and/or the user's portable media device may be stored in one or more data areas 260 that are coupled to one or more media services 220. The information may include the identity of media stored on the user's media player, a record of media accessed by the user, and other information.

In some embodiments, media may be available from network sites or services for a user to stream and/or download. Streaming media is media that is continuously received by, and normally played to, a user while the media is being delivered by a network site or service. A connection to a network site or service is required in order to begin the stream. Downloadable media is media that a user can download from a network site or service and store on a portable music player. Whether streamed or downloaded, media may be delivered for free to a user or a user may be charged to acquire the media. A user may be charged a per unit of media fee, a subscription fee, or some other fee to receive certain rights to use the media. Such rights may limit a user's ability to copy or redistribute the media. In some embodiments, the amount that is charged may vary depending on the number of local media files as compared to the number of related remote media files available from a network site or service. One skilled in the art will appreciate that a network site or service may offer media under a variety of purchase plans.

Figure 3A:
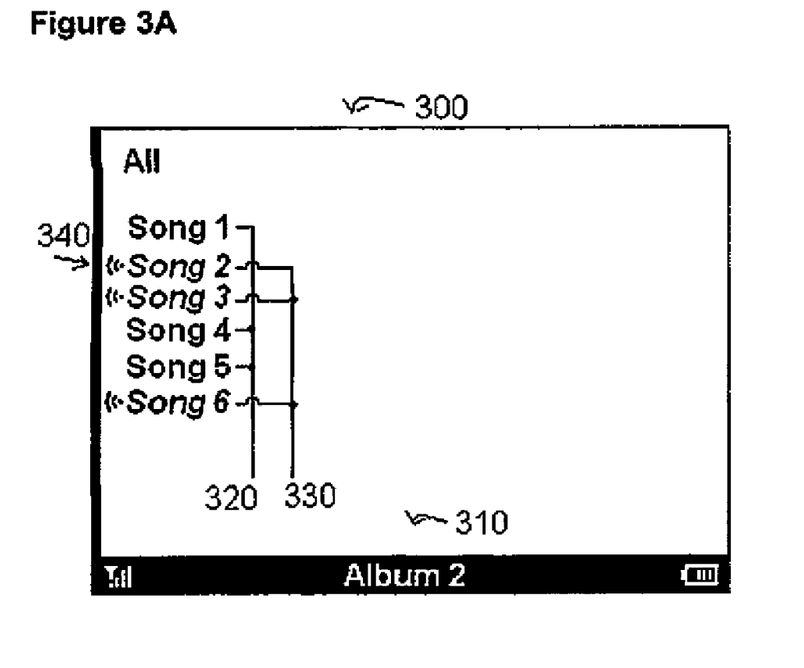
FIG. 3A is a screen shot of an interface for a portable media player that depicts media available from a network site or service for shop and play based on an album browsing context, in accordance with embodiments of the invention.

The facility allows a user to shop for media directly from a portable media player in a variety of contexts, including in particular, integrating with the user's use of the portable media player to play media. FIG. 3A is one example of a context in which a user may shop, in accordance with various embodiments. FIG. 3A is a representative screen shot 300 that depicts a user browsing an album 310 on a portable media player, to select a song from the album 310 to play. Although this embodiment is described with respect to music, one skilled in the art will appreciate that other media types (e.g. video) may be identified and acquired through the same or similar means as described. In the example from FIG. 3A, the facility, in addition to identifying the songs of album already stored in the portable media player available for play, also identifies available remote songs 330 based on the album browsing context of the portable media player and displays the remote songs 330 for the user to acquire directly to the portable media player. In this instance, the facility recognizes that the user is browsing an album 310 to select songs from album 310 to play, and based on data available locally and/or remotely, also recognizes that additional remote songs 330 from the album are available from a network site or service that are not already stored on the portable media player. Thus, the user is able to view and select local songs 320 from the album 310 that are stored on the portable media player to play as well as remote songs 330 from the album 310 not yet on the portable media player to purchase and play. Remote songs 330 may be indicated with a network icon 340 immediately preceding a song. The facility may also display remote media in a different font style and/or color than local media, or with another distinguishing visual feature. The visual indication helps a user distinguish between local media items immediately available for play and those remote media items that require network access to access and possible fees to use. A user may begin an acquisition process for a remote song 330 by selecting a desired remote song. In alternate embodiments, similar to the artist context to be described more fully below, the facility may also include additional media from similar albums to shop and play, or offer the user to option to include. Similarity may be determined in a variety known manners.

Figure 3B:
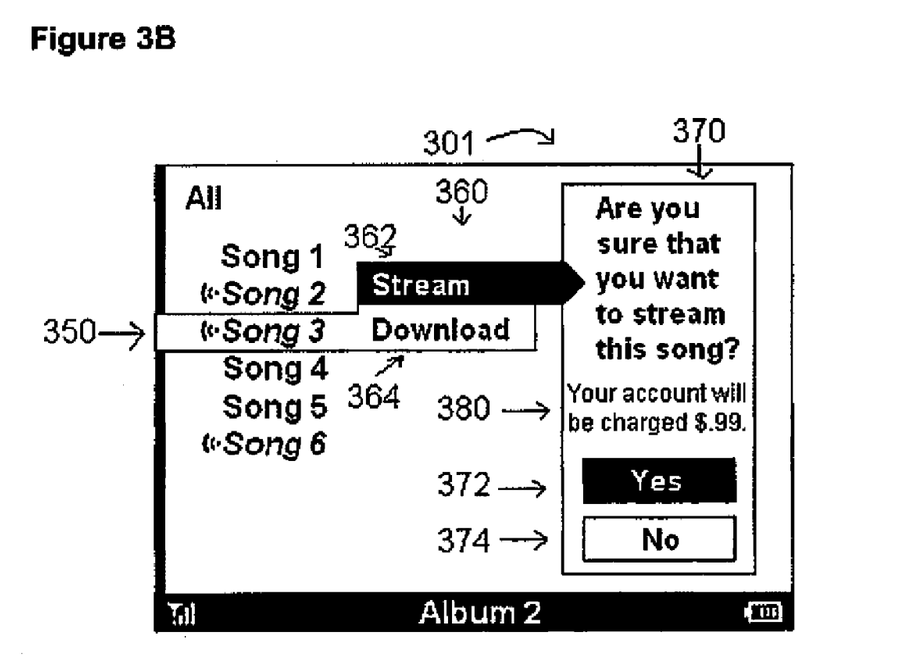
FIG. 3B is a screen shot of an interface for a portable media player that depicts a user acquiring media from a network site or service using a portable media player, in accordance with embodiments of the invention.

FIG. 3B is a representative screen shot 301 that depicts an acquisition process for remote media, in accordance with various embodiments. In the example from FIG. 3B, a user has selected to acquire a remote song 350 from a network site or service that the facility identified for the user based on a context of the user on a portable media player. After the user selects to acquire the remote song 350, the facility presents the user with an acquisition option 360 to either stream 362 or download 364 the remote song 350. In the example from FIG. 3B, the user has selected to stream 362 the remote song 350. After a user selects an acquisition option 360, the facility may present the user with a confirmation message 370 before the facility continues processing the user's selection. The confirmation message 370 may be presented in the form of a separate screen, a pop up window, a menu option, or in another manner. In FIG. 3B, the confirmation message 370 is presented to the user in the form of a menu option. The user is presented the option to confirm 372 the acquisition to stream the remote song 350 and the option to cancel 374 the acquisition. In some embodiments, the facility may require a user to input a password, a personal identification number (PIN), or be otherwise authorized by another security method prior to acquiring media. One skilled in the art will appreciate that there are other methods by which a user's request to acquire media may be confirmed. In some embodiments, a user may not be required to confirm a media request, and media may be automatically acquired when selected by a user. As depicted in FIG. 3B, the facility may also present a user with cost information 380 regarding the acquisition.

Figure 4:
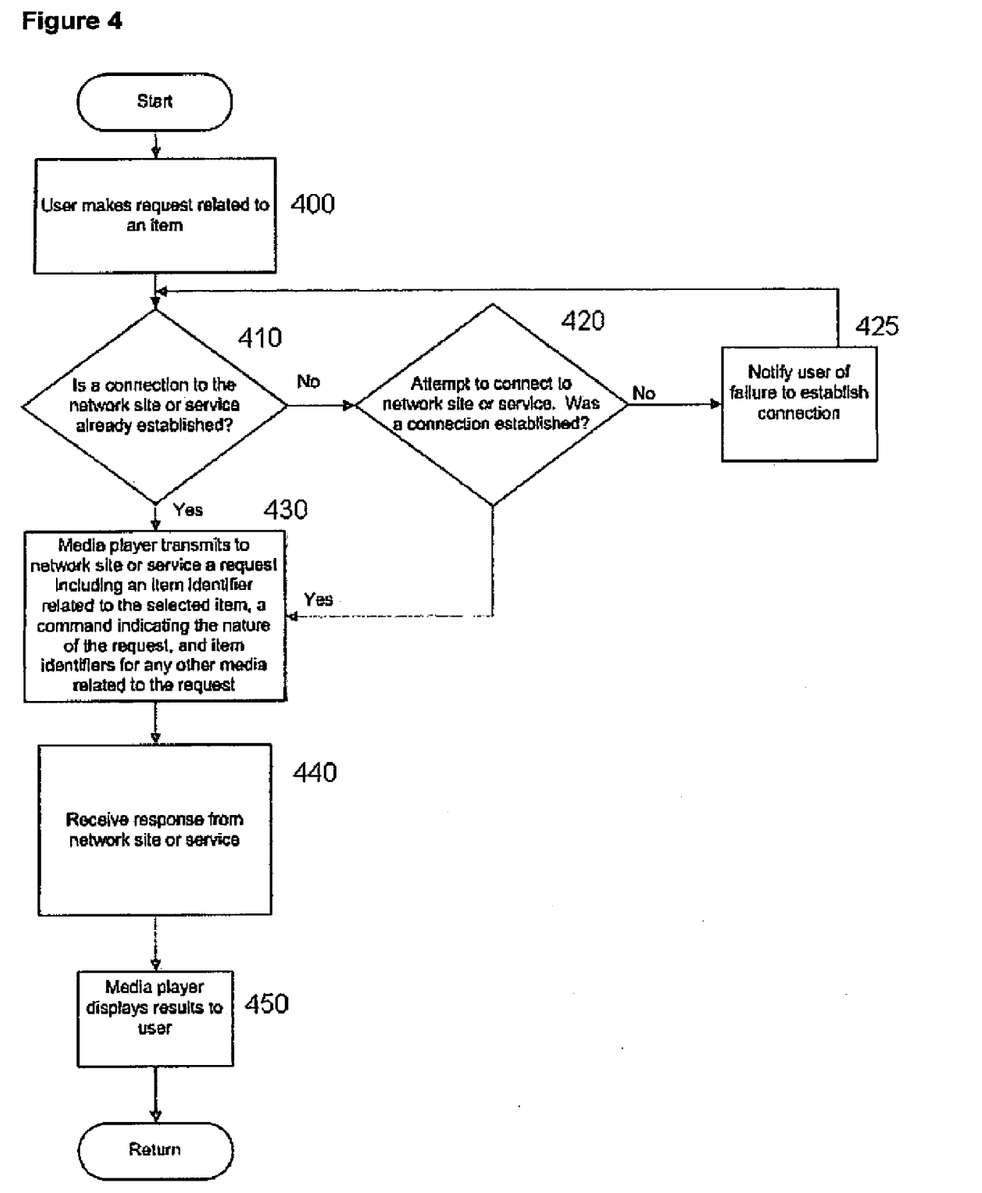
FIG. 4 is a flow diagram of a process by which the facility identifies and delivers remote media to a user of a portable media player, in accordance with embodiments of the invention.

In some embodiments, shopping for media is facilitated by assigning a unique item identifier to each artist, album, song, genre, or other media identifier. FIG. 4 is a flow diagram illustrating a process by which item identifiers are utilized to provide a user with relevant media items, in accordance with various embodiments. A network site or service may assign unique item identifiers to each media item or, alternatively, an item identifier already associated with the media item may be used. At block 400, a user makes a request related to a particular item. Examples of a user's request may include a request for more songs from an album, arising from browse an album (as exemplified above with respect to FIG. 3). At a decision block 410, the facility determines whether a connection to a network site or service is already established, via a wired or wireless connection. If a connection is already established, processing continues at block 430. If the portable media player is not connected to a network site or service, processing continues at block 420, as the player attempts to connect to a network site or service. If no connection can be established, the player may indicate to a user an option for troubleshooting potential connection issues, an option to try to connect again, an option to terminate the connection procedure, or other options 425. If a connection can be established, processing continues at block 430. At block 430, the media player transmits to a network site or service a request that includes an item identifier for the item that is the subject of the request (e.g., the item identifier for the album), item identifiers for items related to the request that are already stored on the portable media player (e.g., the item identifiers for songs by the album already stored on the portable media player), as well as a command indicating the nature of the request (e.g., more songs by the album). In other embodiments, the facility and/or a network site or service may already be aware of the media stored on the portable media player. In such embodiments, the facility may not need to transmit item identifiers for the media items already stored on the media player.

After the facility transmits the necessary information to a network site or service, the network site or service processes the request from the portable media player, which may include comparing item identifiers transmitted from the portable media player with item identifiers for items available at the network site or service. Continuing on to block 440, the portable media player receives from the network site or service an appropriate list of results (e.g., songs of album available from the network site or service and not currently stored on the media player). At block 450, the player displays results that are consistent with the user's request (as illustrated earlier in FIG. 3).

Those skilled in the art will appreciate that media may be identified by one or more possible identifiers, including name, title, identification number, hash value, character string, or another identifier. A user may search for media using one or more identifiers. A remote site or service may perform a keyword search, identification number search, or another type of search as a result of a user's request.

In some embodiments, a remote site or service may return ambiguous results to the facility from a user's request (e.g., the results may identify two or more albums that match a request). The facility may present the user with a selection screen that allows the user to choose a desired item from a list of possible matches, cancel the user's request, or take another action, in addition to the choice between streaming or download described earlier.

In some embodiments, a remote site or service may return no matching items from a user's request. The facility may indicate to the user that no matching media is available. The facility may prompt a user to modify the user's request, cancel the request, or take another action.

In some embodiments, if a user requests to acquire a media item but the facility is unable acquire the media item, the user may be presented with an alert message that indicates that the facility was unable to fulfill the desired request. In some embodiments, the reason for the failure may be provided to the user. After failure, the facility may present the user with an option of attempting to obtain the media again, an option of canceling the request to obtain media, and/or other options regarding how the facility should proceed. The alert message or other options after failure may be presented as part of the display screen, as a pop up window, or in another manner.

Figure 5A:
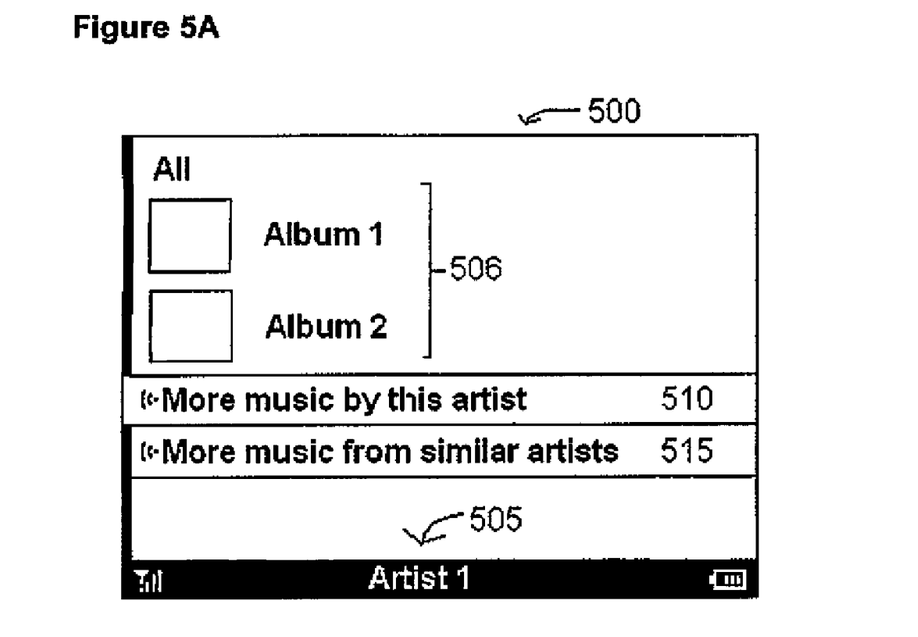
FIG. 5A is a screen shot of an interface for a portable media player that allows a user to shop and play for more music by an artist or similar artists using a portable media player, in accordance with embodiments of the invention.

In some embodiments, the facility, in addition to an album, may allow a user to browse an artist, a genre, an author, or another category associated with media, to select a content for consumption, and enable the user to integrally shop and consume a content of the category not already on the portable media player. For example, FIG. 5A is a representative screen shot 500 in which a user has selected to browse media by an artist 505 to select a song of the artist to play and be able to integrally shop and play songs of the artist that are not already on the portable media player, in accordance with various embodiments. The facility displays local media 506 of the artist 505 available for selection and play and also provides the user a first option 510 to shop for more music by the artist 505 and a second option 515 to shop for more music from similar artists. The facility may present the user with several menu options, including, but not limited to, "More media by Artist 1," "More music by this artist," or "More music by artists similar to Artist 1." When the user selects a menu option, such as the first option 510, "More music by this artist," the facility contacts a remote site or service to fulfill the user's request. If the facility is able to locate media on a remote site or service that is consistent with the user's request, the facility may display available remote media in a manner similar to the example from FIG. 3A or in another manner. A user may acquire and play remote media in a manner similar to the example described above with respect to FIGS. 3A and 3B, or in another manner. Again, similarity may be determined via any one of a number of known manners.

If a user selects to shop for media similar to the user's selection, such as by choosing the second option 515 from FIG. 5A, "More music from similar artists," the facility may contact a remote site or service to fulfill the user's request. A remote site or service may determine which media fulfills the user's request by utilizing predetermined data about the media, third party information, collaborative filtering, recommender systems, or another method known in the art that would enable the remote site or service to provide relevant shopping results for the user. The facility may display results of a user's request in a manner similar to the example from FIG. 3A or in another manner. A user may acquire remote media in a manner similar to the example described above with respect to FIGS. 3A and 3B, or in another manner.

Figure 5B:
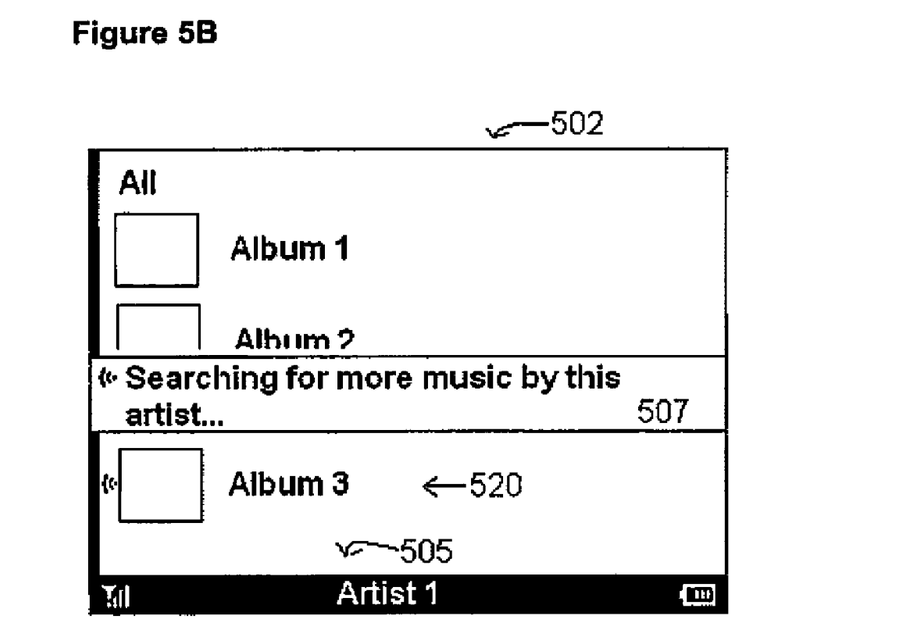
FIG. 5B is a screen shot of an interface for a portable media player that depicts an ongoing search for more music, in accordance with embodiments of the invention.

In some embodiments, after a user requests to begin shopping for media, such as by selecting the first option 510 from FIG. 5A, "More music by this artist," the facility may change the appearance and/or text of the display. FIG. 5B is a representative screen shot 502 that depicts an example of a modified display after a user has selected the first option 510 from FIG. 5A to shop for more music by a selected artist 505. The facility may provide the user with an indication 507 that the facility is attempting to locate media from a network site or service that matches the user's request. The text of the display may be modified to read, "Connecting to media service . . . ," "Searching for more by this artist . . . ," or another indication that represents a task that the facility is attempting to accomplish. For example, FIG. 5B provides an indication 507 that reads, "Searching for more music by this artist. . . . " If the facility is able to locate remote media consistent with the user's request, the facility may display the located remote media 520 to the user while the facility continues its task. For example, in FIG. 5B, the facility presents the user with the located remote media 520 from the network site or service while the facility continues its task. In some embodiments, the user may select to acquire a media item while the facility is still completing its task. After the facility completes its task, the indication 507 will disappear and the media available from the network site or service may be displayed.

Figure 6:
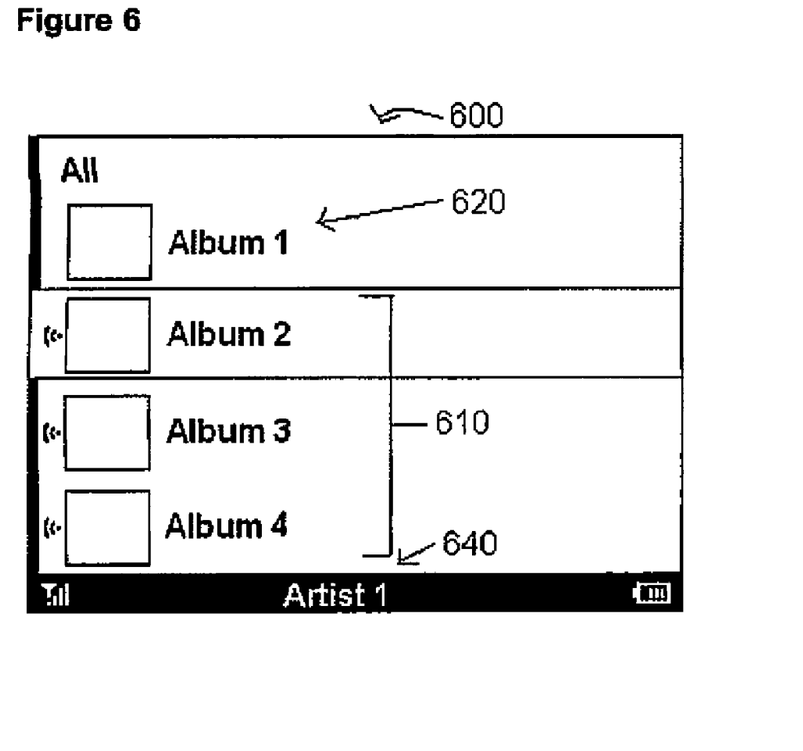
FIG. 6 is a screen shot of an interface for a portable media player that depicts media available from a network site or service for shop and play based on a genre context of a user, in accordance with embodiments of the invention.

In some embodiments, the facility may automatically display media items of a genre available from a network site or service as a user navigates or otherwise uses a portable media player to browse for media under a genre to play. In such embodiments, the facility may present the user with media available from the network site or service that is related to a user's genre context or current activity. FIG. 6 is a representative screen shot 600 depicting a list of remote media 610 of a genre available from a network site or service and local media 620 available on the portable media player as a user browses for media of a genre 640, in accordance with various embodiments.

In various embodiments, the facility may also determine which media of an album, an artist or a genre to display from a network site or service by comparing the context of the media being browsed by a user, by analyzing trends, by analyzing a playlist being browsed or created, by analyzing a category, or by another method. The facility may selectively augment the display of available local media, with selective remote media available for shop and play, based at least in part on the result of the analyses/comparisons.

In some embodiments, the facility may also support shop and play if a portable media player displays a list that is empty. In various embodiments, the facility, in this context, may present a user with a menu option such as "Find some music," or "Shop online." When the user selects such a menu option, the facility contacts a remote site or service to request access to media from which the user may shop. In some embodiments, the user may shop for media by category, including artist, album, genre, or other category. In some embodiments, the user may search for a particular media file or files. One skilled in the art will appreciate that a user may shop for media in other contexts in addition to those described above.

Figure 7:
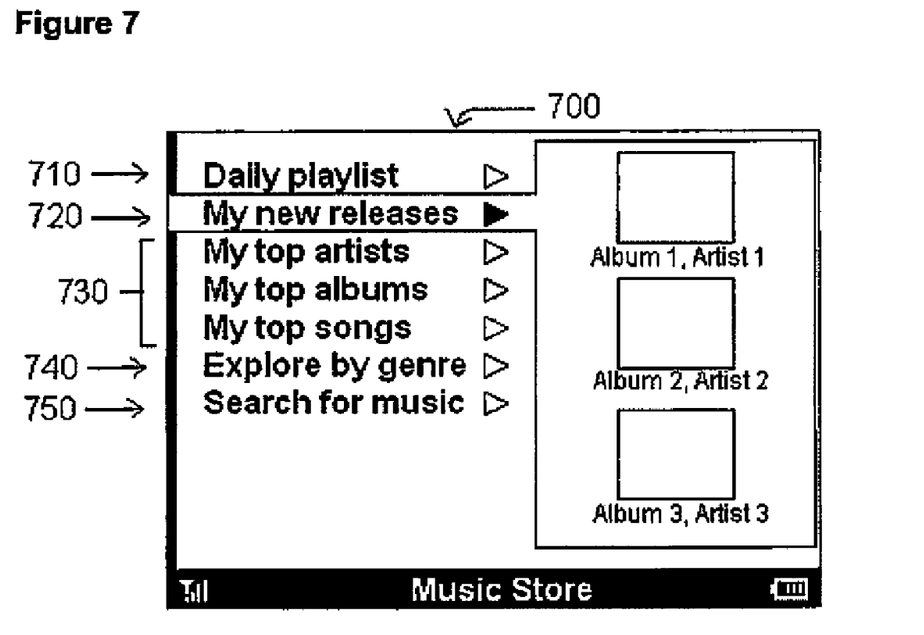
FIG. 7 is a screen shot of an interface for a portable media player that depicts a menu for a network site or service from which a user may generally shop for remote media, in accordance with embodiments of the invention.

In various embodiments, the facility may also support generally shopping for media, such as by selecting an option such as "Shop for music" or "Shop for media." The facility may present the user with a main menu screen for access to a network site or service. FIG. 7 is a representative screen shot 700 depicting a main menu screen that may be used to support shopping of remote media generally, in accordance with various embodiments. From the main menu screen, the user can shop for desired media in an interactive manner, much as a user might shop for media on a personal computer connected to a commercial music site. The main menu screen may present the user with media that a network site or service determines would be relevant for the user. Examples of relevant media may include daily playlists 710, media new to the network site or service 720, media that is recommended to the user based on certain criteria 730, media that is popular, or any other media determined to be relevant to the user. Criteria used to recommend media to a user may include the user's previous shopping experience(s), the shopping experiences of similar users, or other criteria. Media may be considered popular if other users have recently acquired for the media, if third parties or other users have positively reviewed or ranked the media, or for other reasons. The facility may also present an option to browse for more music by genre 740 or to search for music 750 in any number of ways including keyword search. While shopping in this general manner is similar to commercial music sites accessed on a personal computer, by shopping directly from a portable media player, a user avoids the interim step of downloading media to a personal computer as is typically required to transfer media to portable players.

In some embodiments, media may be automatically downloaded to a portable media player. For example, a user may subscribe to a network site or service that offers a download of a daily song or play list. Each day, media may be downloaded from a network site or service without any action required by the user. As another example, a user may subscribe to a network site or service that offers downloads of all media from a specific category; for example, all music from a particular artist. When a network site or service acquires new music consistent with the user's subscription, the music may automatically be downloaded to the user's portable media player. One skilled in the art will appreciate that media may be automatically downloaded as part of a subscription service at intervals other than a day. For example, media may be downloaded automatically to the media player every week, month, or at another period.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A portable media player method comprising:
   receiving, by a portable media player, a first request from a user of the portable media player to browse and select media to play, wherein the first request includes a context, indicated by the user, from which the media should be browsed and selected;
   in response to the first request, displaying, to the user by the portable media player, a list of media associated with the context for browsing and selection by the user, including in the list media associated with the context stored on the portable media player available for selection and play, and remote media associated with the context available from a remote service for acquisition and play;
   receiving, from the user by the portable media player, a selection of one of the remote media available for selection and play;
   transmitting from the portable media player to the remote service a second request including an item identifier of the selected remote media, a command indicating the nature of the second request, and item identifiers for any other media related to the request;
   receiving a response from the remote service; and
   presenting, to the user by the portable media player, the selected remote media.

2. The method of claim 1, wherein the context is a selected one of an album, an artist or a genre.

3. The method of claim 1, further comprising the portable media player, in response to the receiving, contacting the remote service to ascertain the remote media associated with the context available from the remote service for acquisition and play.

4. The method of claim 1, wherein the facilitating comprises the portable media player offering the user a choice to stream or download the remote media to the portable media player.

5. A portable media player method comprising:
   receiving, by a portable media player, a first request from a user of the portable media player to browse and select media to play, wherein the first request includes a context, indicated by the user, from which the media should be browsed and selected;
   in response to the first request, displaying, to the user by the portable media player a list of media associated with the context for browsing and selection by the user, including media associated with the context stored on the portable media player available for selection and play, and an invitation to include remote media associated with the context or a similar context available from one or more remote service for acquisition and play;
   receiving, from the user by the portable media player, a selection of one of the remote media available for selection and play;

transmitting from the portable media player to the remote service a second request including an item identifier of the selected remote media, a command indicating the nature of the second request, and item identifiers for any other media related to the request;

receiving a response from the remote service; and presenting, to the user by the portable media player, the selected remote media.

6. The method of claim 5, wherein the context is a selected one of an album, an artist or a genre.

7. The method of claim 5, wherein the invitation comprises an invitation to the user to search for additional remote media of the same or similar context.

8. The method of claim 7 further comprising:

receiving, by the portable media player, an acceptance by the user of the invitation to search for additional remote media of the same or similar context; and searching in response, by the portable media player, for additional remote media of the same or similar context.

9. The method of claim 8 further comprising:

redisplaying the list by the portable media player, including additional remote media of the same or similar context found, if additional remote media of the same or similar context are found; or the portable media player informing the user that no additional remote media of the same or similar context are found, if additional remote media of the same or similar context are not found.

10. A portable media player comprising:

a storage module to store a plurality of media;

a display module;

an input component configured to enable a user of the portable media player to input a first request to browse and select media to play, wherein the input component is further configured to receive an indication of a context from the user from which the media should be browsed and selected; and a processing module coupled to the storage component, the display module and the input component to display to the user a list of media associated with the context for browsing and selection by the user, including media associated with the context stored on the portable media player available for selection and play, and remote media associated with the context available from a remote service for acquisition and play;

wherein the input component is further configured to receive from the user a selection of one of the remote media available for selection and play;

wherein the processing component is further configured to transmit from the portable media player to the remote service a second request including an item identifier of the selected remote media, a command indicating the nature of the second request, and item identifiers for any other media related to the request, and to receive a response from the remote service; and wherein the display component is further configured to present the selected remote media.

11. The player of claim 10, wherein the context is a selected one of an album, an artist or a genre.

12. The player of claim 10, wherein the device further comprises a communication interface coupled to the processing module, and the processing module is further configured to contact the remote service to ascertain the remote media associated with the context available from the remote service for acquisition and play.

13. The player of claim 10, wherein the processing module is further configured to offer the user a choice to stream or download the remote media to the portable media player.

14. A portable media player comprising;

a storage module to store a plurality of media;

a display module;

an input component configured to enable a user of the portable media player to input a first request to browse and select media to play, wherein the input component is further configured to receive an indication of a context from the user from which the media should be browsed and selected; and a processing module coupled to the storage component, the display module and the input component to display to the user a list of media associated with the context for browsing and selection by the user, including media associated with the context stored on the portable media player available for selection and play, and an invitation to include remote media associated with the context or a similar context available from one or more remote service for acquisition and play;

wherein the input component is further configured to receive from the user a selection of one of the remote media available for selection and play;

wherein the processing component is further configured to transmit from the portable media player to the remote service a second request including an item identifier of the selected remote media, a command indicating the nature of the second request, and item identifiers for any other media related to the request, and to receive a response from the remote service; and wherein the display component is further configured to present the selected remote media.

15. The player of claim 14, wherein the context is a selected one of an album, an artist or a genre.

16. The player of claim 14, wherein the invitation comprises an invitation to the user to search for additional remote media of the same or similar context.

17. player of claim 14 wherein the processing module is further configured to:

redisplay the list, including additional remote media of the same or similar context found, if additional remote media of the same or similar context are found; or inform the user, by the portable media player, that no additional remote media of the same or similar context are found, if additional remote media of the same or similar context are not found.

18. An article of manufacture comprising: a computer readable storage medium; and computer-executable instructions stored on the storage medium and configured to enable a portable media player, in response to execution of the instructions by the portable media player, to:

receive a first request from a user of the portable media player to browse and select media to play, wherein the first request includes a context, indicated by the user, from which the media should be browsed and selected;

in response to the request, display, to the user, a list of media associated with the context for browsing and selection by the user, including in the list media associated with the context stored on the portable media player available for selection and play, and either remote media associated with the context available from a remote service for acquisition and play or an invitation to include remote media associated with the context or a similar context available from one or more remote service for acquisition and play;

receive, from the user by the portable media player, a selection of one of the remote media available for selection and play;

transmit from the portable media player to the remote service a second request including an item identifier of the selected remote media, a command indicating the nature of the second request, and item identifiers for any other media related to the request;

receive a response from the remote service; and present, to the user by the portable media player, the selected remote media.

19. The article of claim 18, wherein the computer-executable instructions further enable the portable media player, in response to execution of the instructions by the portable media player, to contact the remote service to ascertain the remote media associated with the context available from the remote service for acquisition and play.

20. The article of claim 18, wherein the computer-executable instructions further enable the portable media player, in response to execution of the instructions by the portable media player, to:

receive an acceptance by the user of the invitation to search for additional remote media of the same or similar context; and in response, search for additional remote media of the same or similar context.

* * * * *